United States Patent
Reardon, Jr.

(10) Patent No.: US 8,074,781 B1
(45) Date of Patent: Dec. 13, 2011

(54) VIAL SORTING APPARATUS

(75) Inventor: Joseph P. Reardon, Jr., St. Joseph, MO (US)

(73) Assignee: Reardon Machine Co., Inc., St. Joseph, MO (US)

( * ) Notice: Subject to any disclaimer, the term of this patent is extended or adjusted under 35 U.S.C. 154(b) by 494 days.

(21) Appl. No.: 12/235,016

(22) Filed: Sep. 22, 2008

(51) Int. Cl.
*B65G 29/00* (2006.01)

(52) U.S. Cl. ...................................... 198/392

(58) Field of Classification Search ............... 198/392, 198/447, 364, 445, 446, 456, 597, 598, 443, 198/434, 457.07, 457.01, 580, 636, 637, 198/690.2, 380, 438, 448, 451, 452, 601, 198/602, 793, 384, 411, 860.1, 397.01, 397.06, 198/382, 395, 400, 453, 454
See application file for complete search history.

(56) References Cited

U.S. PATENT DOCUMENTS

| | | | | |
|---|---|---|---|---|
| 398,651 A * | 2/1889 | Peters | ...................... | 198/397.01 |
| 1,416,763 A * | 5/1922 | Thom | ........................... | 198/445 |
| 2,656,910 A * | 10/1953 | Kraus et al. | .................... | 198/445 |
| 2,671,549 A * | 3/1954 | Lubetkin | ....................... | 198/445 |
| 2,970,683 A * | 2/1961 | Crosby et al. | .................. | 198/400 |
| 3,104,753 A * | 9/1963 | Osborne | ....................... | 198/447 |
| 3,331,486 A * | 7/1967 | Towry | ............................ | 198/380 |
| 3,722,659 A * | 3/1973 | Aidlin et al. | .................. | 198/400 |
| 3,833,111 A * | 9/1974 | Sterling et al. | ............... | 198/400 |
| 4,082,177 A * | 4/1978 | Aidlin et al. | .................. | 198/453 |
| 4,252,232 A * | 2/1981 | Beck et al. | .................... | 198/443 |
| 4,401,020 A * | 8/1983 | Brux | ................................ | 100/7 |
| 5,236,077 A * | 8/1993 | Hoppmann et al. | .......... | 198/380 |
| 6,564,924 B2 * | 5/2003 | Street et al. | ................... | 198/400 |
| 6,585,104 B2 * | 7/2003 | Horton et al. | ................. | 198/594 |
| 6,637,600 B2 * | 10/2003 | Miyamoto et al. | ............ | 209/539 |
| 7,255,218 B2 * | 8/2007 | Yoda | ............................. | 198/448 |

* cited by examiner

*Primary Examiner* — Gene Crawford
*Assistant Examiner* — William R Harp
(74) *Attorney, Agent, or Firm* — Stinson Morrison Hecker LLP; Mark C. Young

(57) ABSTRACT

The present invention is directed to an apparatus for sorting vials and small containers. The apparatus comprises a plurality of compartments, arranged linearly, with two agitation conveyor belts and a sorting conveyor belt running along the bottom of the compartments. Each compartment includes a rotatable brush, driven by a drive motor and a diverter piece to direct vials into receptacles on the sorting conveyor belt. Vials falling within the receptacles are ejected into vertical alignment so that the vials are sorted and oriented properly for packaging.

18 Claims, 5 Drawing Sheets

VIAL SORTING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates generally to an apparatus for sorting vials. More specifically the invention relates to a linear vial sorting apparatus for accepting bulk vials and efficiently sorting, arranging, and orienting the vials for packaging and transport.

DESCRIPTION OF RELATED ART

Vials, small bottles, and other like containers are commonly used to contain various liquid and solid products for later use. For example, in the pharmaceutical industry, small vials are used to store liquid medicines in predetermined doses for later administration, and small bottles are used to contain solid medicines (such as pills or tablets) until use. Likewise, in the cosmetic industry, small bottles are used to contain various cosmetic products such as lotion, makeup, and the like. The use and manufacture of products in these vials and small bottles is commonplace in these and other industries.

The manufacture of vial-stored products typically involves at least two distinct steps: (1) a filling step—where the product is inserted into the container (e.g., liquid is injected into a vial) and the container is sealed (with a lid, stopper, or the like), and (2) a packaging step—where the filled and sealed vials are sorted and packaged for distribution.

The packaging step involves obtaining a large quantity of filled and sealed containers and sorting and arranging those containers so that they can be placed in boxes or other containers for shipment to end-users of the product. For example, in the case of pharmaceutical vials, packaging of the vials involves arranging the vials in an upright position for placement into a box holding a specific number of vials. The filled box is then sealed and ready for shipment to the end-user or purchaser of the product.

While machines for sorting and arranging the filled and sealed vials for packaging, such as centrifugal and vibratory sorters, exist in the industry, they suffer from numerous drawbacks.

Centrifugal sorters include a large bowl into which the vials to be sorted are dumped. The bowl is then rotated to force the vials (via centrifugal force) to the sides of the bowl where a take-up belt (having receptacles to receive the vials) is positioned. Vials falling within a receptacle on the belt are transported by the belt out of the sorter for further packaging. In the case of sorting pharmaceutical vials, which typically have a small groove at the cap end of the vial, the centrifugal sorter includes a stop through which the vials on the take-up belt must pass. Any vial that is not aligned properly (e.g., upside down, or not positioned completely within the receptacle) is caught by the stop so that the vial is ejected from the take-up belt and returned to the pool of vials in the bowl of the sorter. Thus, the vials must be arranged upright, with the caps on top, before being transported out of the sorter. While a centrifugal sorter eventually accomplishes the sorting task, it does not do so in an efficient or predictable manner.

Because different vials having different products must be rotated at different speeds in order to effectively distribute the vials within the bowl, it is cumbersome to adapt the centrifugal sorter to sort different products. Furthermore, because vials having an improper alignment are returned into the bowl, the average time for any given vial to achieve the correct alignment and pass through the stop is relatively long. Because any given vial may be rejected numerous times (because of improper alignment), it is possible for some vials to remain in the bowl virtually indefinitely. Thus, there is no guarantee that all of the vials are being timely processed, particularly in the case where more vials are continually being added to the bowl to support a continuous production line. Because of these limitations, centrifugal sorters are typically limited to processing five-hundred or so vials per minute, and are particularly ill-suited for processing quantities of less than one-thousand vials total.

Vibratory sorters are similar to the centrifugal sorters just described, using a large bowl to contain the vials being sorted. However, rather than spinning the bowl to force the vials into receptacles in the take-up belt, the bowl is vibrated to jostle the vials along the take-up belt, with those vials being properly positioned within the receptacle being allowed to pass, those not positioned within a receptacle are ejected and returned into the bowl. As with the centrifugal sorter, the vibratory sorter has all of the disadvantages of quality control (vials may be in the bowl for a long period of time, with no guarantee that vial will be processed) as described above with respect to the centrifugal sorter. And, as with the centrifugal sorter, the vibratory sorter is particularly ill-suited for production runs of less than one-thousand or so vials, and can only process approximately four-hundred vials per minute. Finally, vibratory sorters are exceedingly noisy during operation, and thus cannot be operated in all environments without requiring operators to wear hearing protection.

Accordingly, it can be seen that a need remains for a vial sorter capable of sorting vials at a high-rate of speed, that ensures that all vials are timely processed, and that can be efficiently employed for small production runs.

BRIEF SUMMARY OF THE INVENTION

The present invention is directed to an apparatus for sorting and arranging vials so that the vials can be stacked, packaged, or otherwise handled. The apparatus comprises a plurality of compartments, arranged linearly, with two agitation conveyor belts and a sorting conveyor belt running along the bottom of the compartments. Each compartment includes a rotatable brush, driven by a drive motor and a diverter piece to direct vials into receptacles on the sorting conveyor belt. Vials falling within the receptacles are transported to an ejection and alignment area where the vials are ejected into a vertical alignment so that the vials are sorted and oriented properly for packaging.

Additional aspects of the invention, together with the advantages and novel features appurtenant thereto, will be set forth in part in the description which follows, and in part will become apparent to those skilled in the art upon examination of the following, or may be learned from the practice of the invention. The advantages of the invention may be realized and attained by means of the instrumentalities and combinations particularly pointed out in the appended claims.

DETAILED DESCRIPTION OF EXEMPLARY EMBODIMENTS

Figure 1:
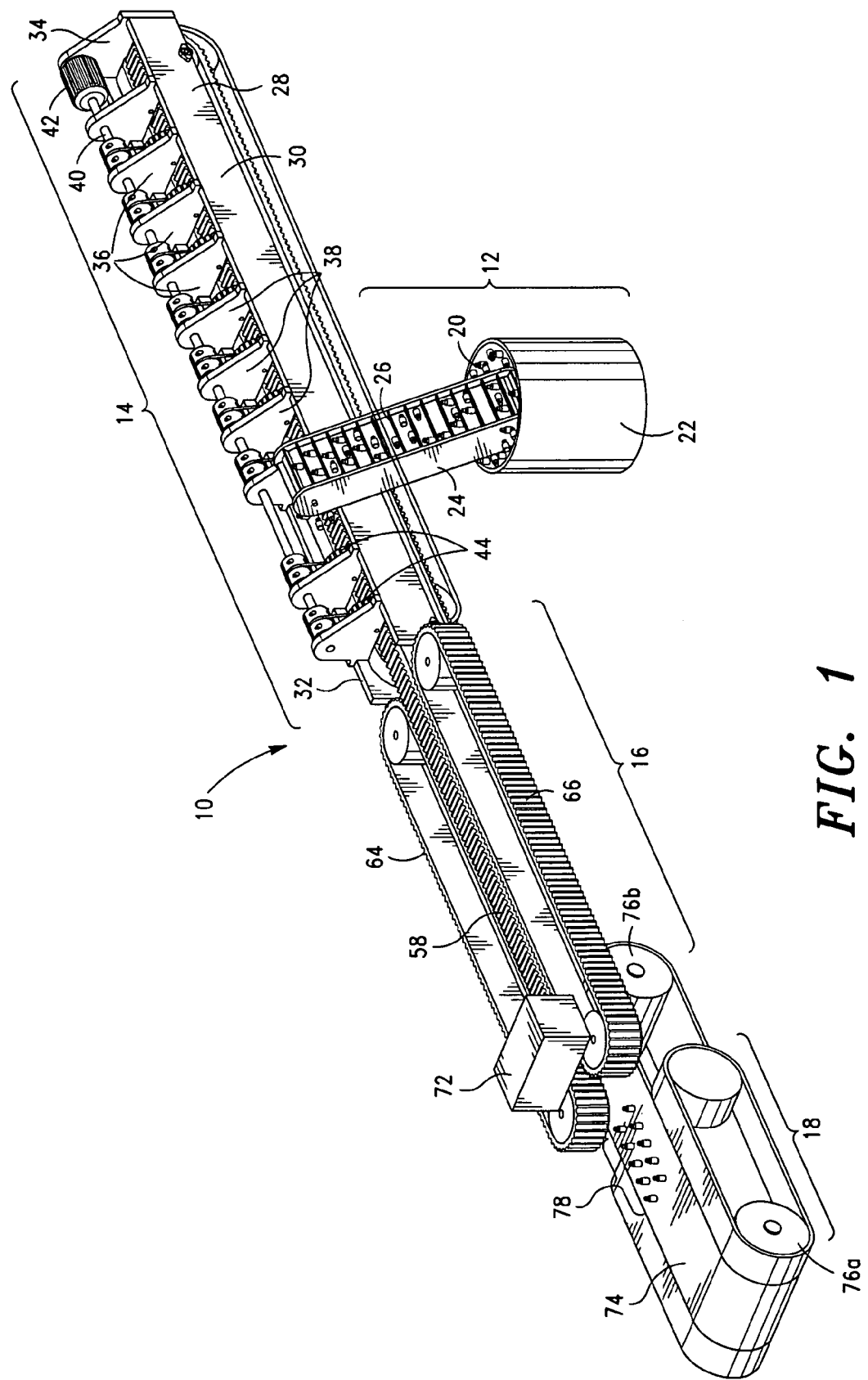
FIG. 1 is a perspective view of a vial sorting apparatus in accordance with an exemplary embodiment of the present invention.

Referring to FIGS. 1-5, a vial sorting apparatus in accordance with an exemplary embodiment of the present invention is depicted generally by the numeral 10. Looking first to FIG. 1, apparatus 10 generally comprises a loading area 12, a sorting area 14, an alignment and ejection area 16, and an off-take area 18. These designated general areas of the apparatus are for descriptive purposes only, and are not intended to be limiting as all of the areas of the apparatus operate in conjunction, with various components of the apparatus overlapping and cooperating between these general areas. Note that, for clarity, no supporting structure for the apparatus is depicted in the figures. It will be understood by those skilled in the art that the vial sorting apparatus of the present application may be placed and/or mounted on any appropriate support structure, such as a frame, table, support legs, or the like. Because the apparatus is adaptable to various uses, any support structure may be adapted in accordance with that particular use. Such variations in any support structure are not limiting, and are within the scope of the present invention.

In loading area 12, vials to be sorted 20 are stored in a hopper 22, and are transported from the hopper into the sorting area 14 via a vertical conveyor 24. Once introduced into the sorting area 14, the vials are sorted (as will be described in more detail hereinbeow) and transported to the alignment and ejection area 16 where they are positioned vertically, then transported to the off-take area 18 where they can be further transported and/or packaged for distribution. With the apparatus generally set forth, each general area will now be described in more detail.

Looking first to loading area 12 in FIG. 1, hopper 22 is a simple storage hopper into which quantities of vials 20 are placed for sorting. Vertical conveyor 24 is a standard powered conveyor having a plurality of steps or pockets 26 on a continuous belt. With the vertical conveyor extending into the hopper as depicted in FIG. 1, as the continuous belt rotates around the conveyor vials 20 are pulled from the hopper via the steps on the conveyor and transported to the sorting area 14 of the apparatus. As will be apparent to those skilled in the art, additional vials may be added to hopper 22 as it empties so that a continuous production line of sorted vials can be supported. It is also understood that the hopper and vertical conveyor are exemplary, and that various configurations and alternatives may be employed within the scope of the present invention. For example, hopper 22 may be any size or shape, or there may be multiple hoppers containing vials. Or, rather than being positioned generally below the sorting apparatus, hopper 22 may be an overhead hopper having a chute to distribute the vials into one or more compartments of the sorting area. These and other variations are within the scope of the present invention.

Figure 2:
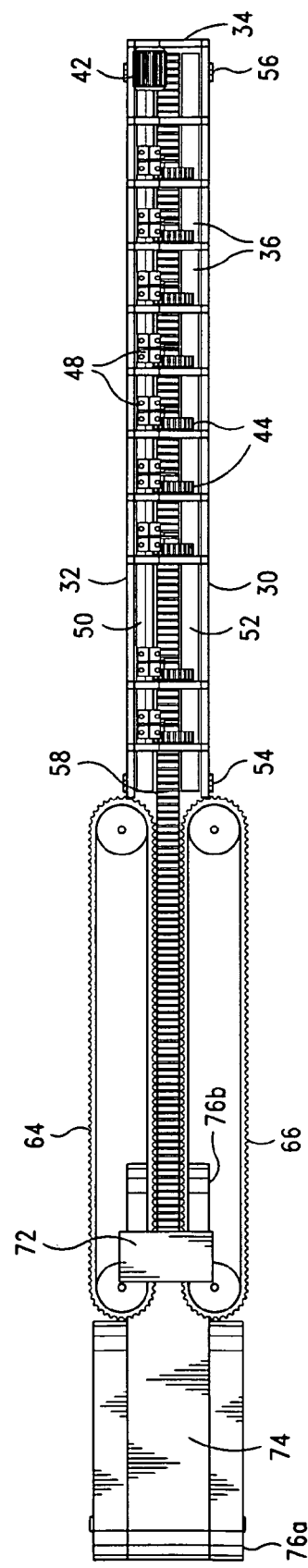
FIG. 2 is a top view of the vial sorting apparatus of FIG. 1.
Figure 3:
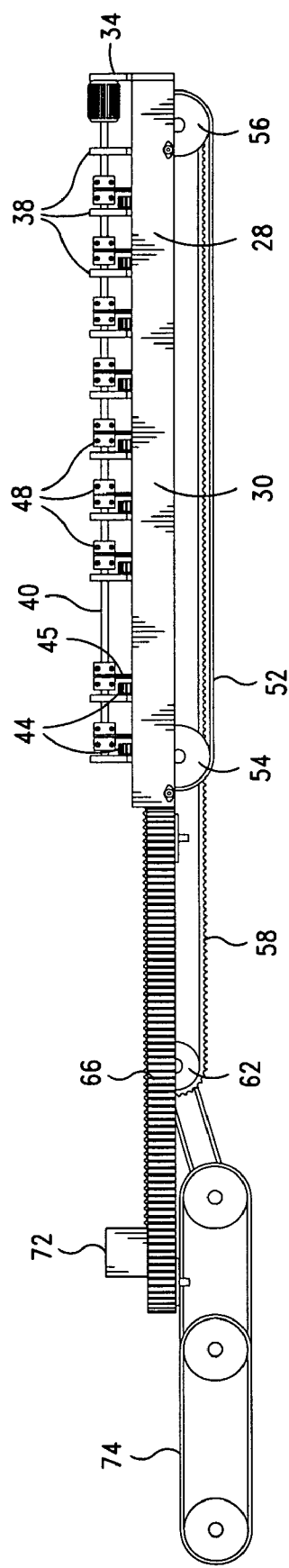
FIG. 3 is a side view of the vial sorting apparatus of FIG. 1.
Figure 4:
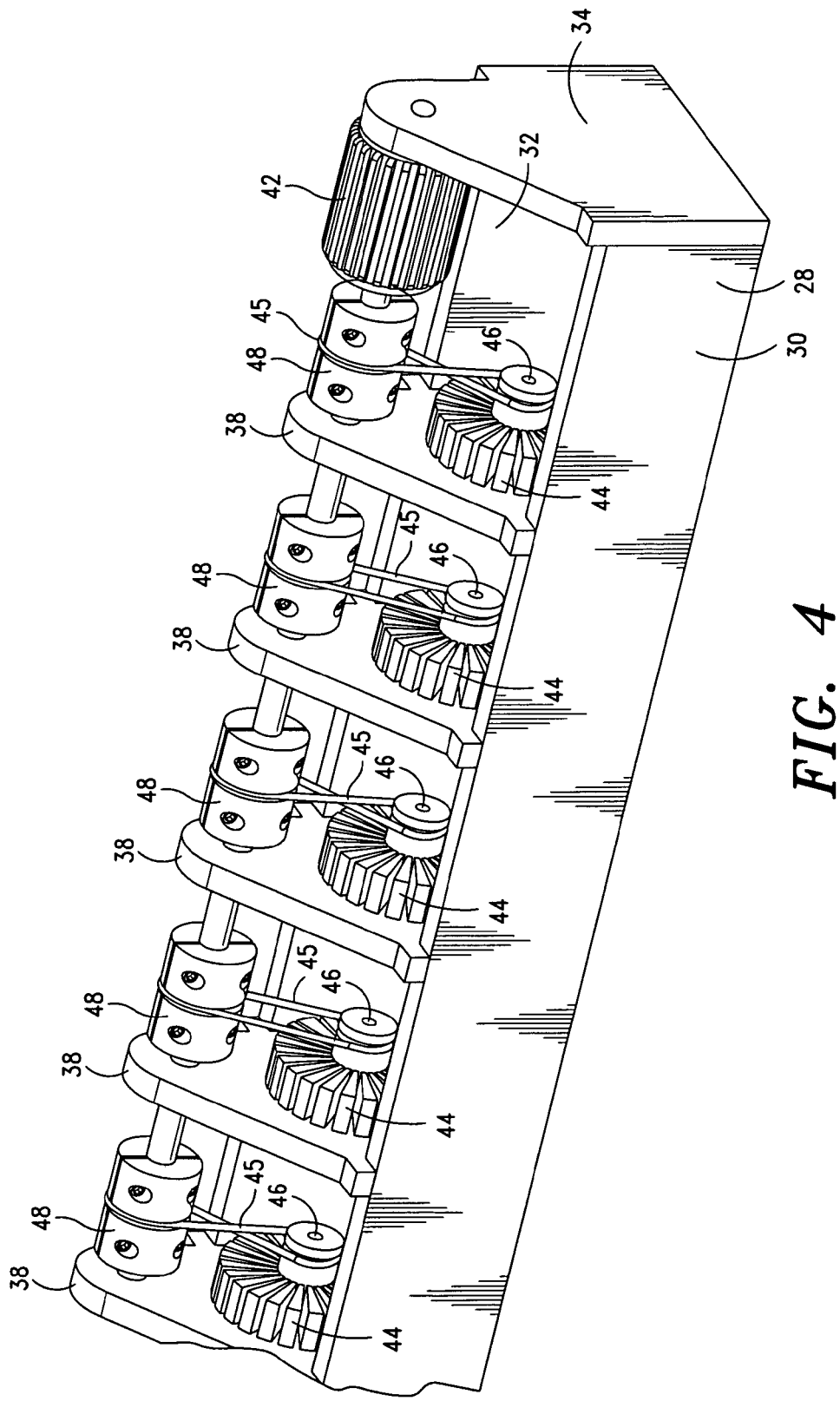
FIG. 4 is a close-up, perspective view of a portion of the apparatus of FIG. 1.

Turning to FIGS. 1-5 in conjunction, sorting area 14 comprises a generally rectangular main body 28 formed from a front side 30 and a rear side 32 connected by an end piece 34 at the far end of the apparatus, leaving a partially open end where the main body merges into the alignment and ejection area 16. The configuration of the front side, rear side, and end piece thus form a cavity therebetween. As best seen in FIG. 4, multiple compartments 36 are formed in the main body by dividers 38 extending across and attached to the front and rear sides. Each divider 38 includes an upwardly extending lobe-shaped portion having a bore therethrough for receiving a drive shaft, and a downwardly extending rectangular-shaped portion that conforms to the front and rear sides so that the divider fits tightly between the sides and extends partially into the cavity area. A drive shaft 40 extends the length of the sorting area 14, passing through the bore in each of the dividers 38, with the far end of the drive shaft attached to a drive motor 42. Drive shaft 40 is preferably comprised of multiple short shaft pieces connected via power take-off hub 48 as described below. Drive motor 42 may be any suitable motor, AC or DC powered, capable of rotating drive shaft 40 and the coupled rotatable brushes as described below. A cylindrical power take-off hub 48 is attached around the drive shaft in each compartment 36, connecting the multiple short pieces of drive shaft 40. A rotatable brush 44 having an extending hub 46 is attached to the lower portion of each divider within each compartment 36, with a resilient band 45 attached between the hub of the rotatable brush and the power take-off hub 48 on the drive shaft. Thus, as the drive motor rotates the drive shaft, the power take-off hub in each compartment rotates to drive the resilient band 45, which in turn rotates the brush 44 within the compartment. As depicted in FIG. 4, the resilient drive bands (coupling the power take-off hub to the hub of the rotatable brush) in adjoining compartments alternate between an untwisted configuration wherein the rotatable brush is driven in the same direction as the drive shaft, and a twisted configuration wherein the rotatable brush is driven in a direction opposite that of the drive shaft. Thus, in operation, the rotatable brushes in adjoining compartments rotate in opposite directions.

Various configurations and alternative embodiments of the components just described are contemplated by the present invention. For example, the diameters of the power take-off hubs may be varied to correspondingly vary the rotational speed of the brush. And, while the dividers 38 are shown as being generally evenly spaced to form similarly-sized compartments 36, the spacing of the dividers may be varied as required. For example, as best seen in FIG. 1, the compartment which receives the vials from the vertical conveyor 24 is wider than the other compartments of the apparatus.

Figure 5:
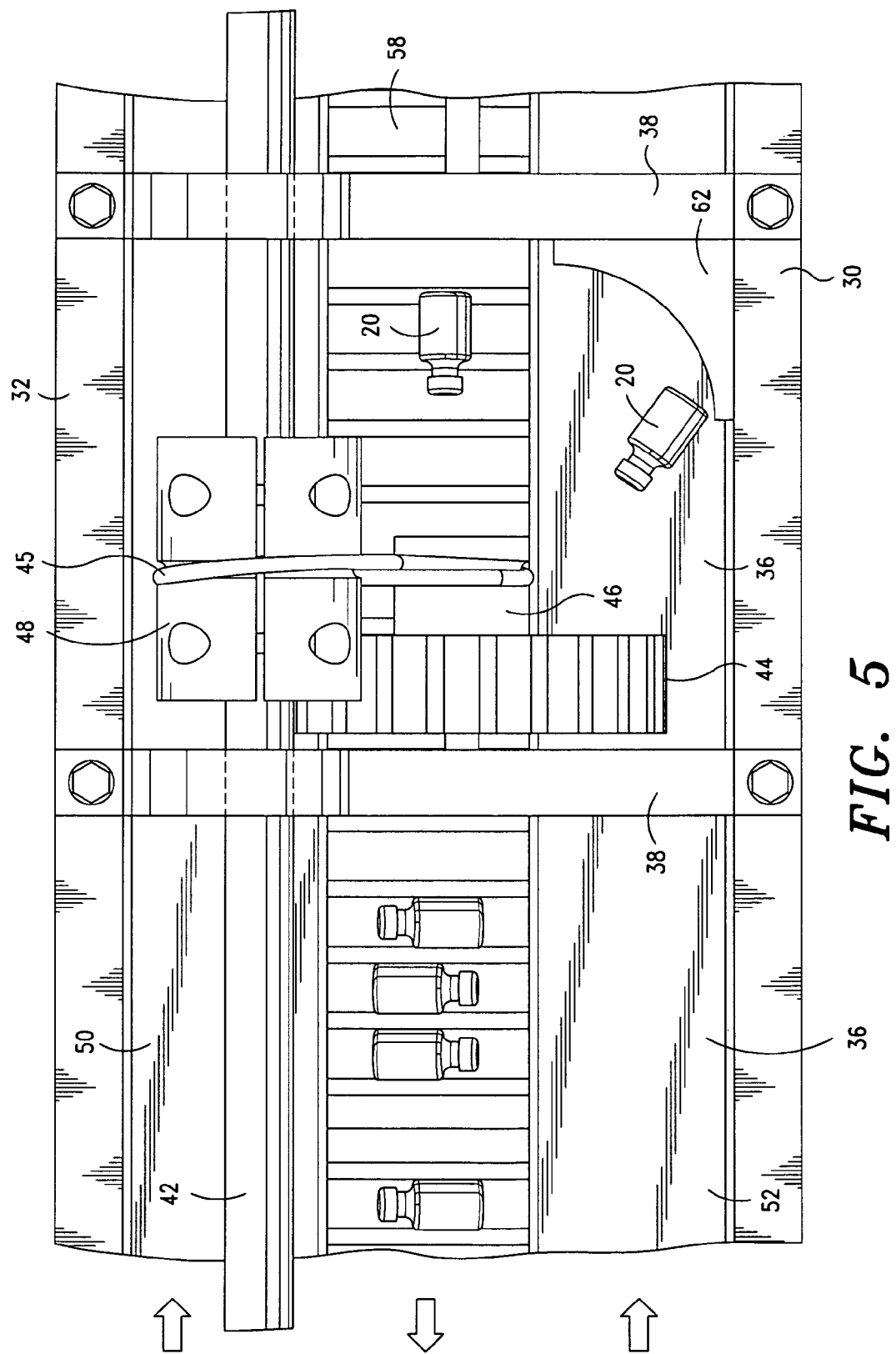
FIG. 5 is a close-up, top view of a portion of the apparatus of FIG. 1.

Continuing with the description of the sorting area, as best seen in FIG. 5, first and second agitation conveyor belts 50, 52 are positioned on opposite sides of the main body, adjacent the front side and rear side pieces 30, 32, respectively. Agitation belts 50, 52, run substantially the length of the sorting area 14 along the bottom of main body 28. As seen best in FIG. 3, the agitation belts extend the length of the main body, between hubs 54 and 56 so that the belts rotate continuously along the bottom sides of the main body. A sorting conveyor belt 58 comprising a series of receptacles configured to receive vials 20, extends substantially the length of the apparatus 10 from the sorting area 14 to the alignment and ejection area 16, and transports the sorted vials from the sorting area in the receptacles on the belt. Similar to the agitation conveyor belts, the sorting conveyor belt 58 extends between hubs so that the belt rotates continuously along the center of the bottom of main body 28 for transporting sorted vials. The arrows shown in FIG. 5 depict the preferable movement direction of the agitation conveyor belts 50, 52, which is opposite the direction of the sorting conveyor 58. Thus, the agitation conveyor belts tend to move vials towards the far end of the apparatus, towards end piece 34, while the sorting conveyor belt 58 moves vials within the receptacles out of the sorting area 14 and towards the alignment and ejection area 16.

The agitation belts and sorting belt are preferably driven via electric drive motors as is known in the art, although any suitable drive mechanisms may be equally used within the scope of the present invention. Preferably, agitation conveyor belts 50, 52 are driven from a common drive motor and hub mechanisms, although they may also be driven from separate motors. Preferably, sorting conveyor belt 58 is driven by a motor separately from the agitation conveyor belts, although alternatively it may be driven from a common motor and/or gear mechanism as the agitation conveyors. These and other variations of the driving of the conveyor belts will be apparent to those skilled in the art and are within the scope of the present invention.

Looking still to FIG. 5, each compartment further includes a diverter piece 62 mounted between the front or rear wall 30, 32 and the divider piece 38 and having a concavely shaped surface that acts to deflect any vial transported against the diverter piece towards the center sorting conveyor belt 58. Each compartment 36 thus includes two agitation conveyor belts 50, 52 that act to transport vials 20 through the compartment. A rotatable brush 44 within each compartment acts to brush the vials off of the agitation conveyor belts and into receptacle on the sorting conveyor belt 58. Vials that still remain on the agitation conveyor belts are diverted (via diverter piece 62) towards the center sorting conveyor 58, where they may fall into a receptacle for transport out of the sorting area 14 of the apparatus, or may be again brushed (by rotatable brush 44) into a receptacle.

Looking to FIGS. 1-3, vials that have been swept into receptacles in the sorting conveyor 58 are transported to the alignment and ejection area 16. As best seen in FIG. 1, in the alignment and ejection area, the sorting conveyor 58 moves between two vertical conveyor belts 64, 66. The vertical conveyor belts 64, 66 are similar in configuration to the sorting conveyor belt 58, each having a surface comprising a plurality of receptacles configured to receive vials. An ejection mechanism 72 positioned along the top of the apparatus is operable to detect vials in the receptacles of the sorting conveyor 58, and to eject those vials into a vertical receptacle in either the front or rear vertical conveyor belt 66, 64. Ejection mechanism 72 preferably uses a pneumatic ejection solenoid operable to eject the vial from the sorting conveyor using a burst of pressurized air directed into the receptacle of the sorting conveyor 58. Of course, other ejection mechanisms or means known in the art, such as mechanical solenoids, may also be used within the scope of the present invention. Ejection mechanism 72 is also preferably operable to detect a metal cap on a vial to thus determine the orientation of the vial within the receptacle of the sorting conveyor 58 so that the vial can then be ejected into the appropriate vertical conveyor (rear vertical conveyor 64 or front vertical conveyor 66) to position the vial in an upright position, with the cap on the top end of the vertically oriented vial.

Looking still to FIG. 1, as vials are ejected to the appropriate vertical conveyor belt 64, 66, the vertical conveyor belts then transport the vials to the off-take area 18. The off-take area 18 includes an off-take conveyor 74 operable to transport the sorted vials 78 coming off of the vertical conveyor belts away from the sorting apparatus. Of course, off-take area 18 may include other tables, conveyors, or the like necessary to transport a quantity of sorted vials to further sorting or packaging equipment.

Operation

Looking to FIGS. 1-5, the operation of the vial sorting apparatus herein set forth will now be described. Looking first to FIG. 1, a quantity of vials 20 to be sorted is placed into hopper 22. As described previously, the quantity of vials can be a single, small quantity batch, can be a large quantity, or can even be a continuous run accomplished by adding additional vials to the hopper as they are depleted. With the vials loaded, the apparatus is started, with the agitation conveyors 50, 52 and sorting conveyor 58 in the sorting area 14 driven by their respective drive motors, the vertical conveyors 64, 66 in the ejection and alignment area 16 driven by their drive mechanisms, and off-take conveyor 18 driven by its drive mechanism. Drive motor 42 is also started and is operable to turn drive shaft 40 which in turn rotates the brushes 40 within the compartments 36.

With the apparatus running, vertical conveyor 24 is started so that steps 26 on the conveyor transport vials 20 up from the hopper 22, dumping the vials into the sorting area 16 into one of the compartments 36 in the main body 28. Looking to FIG. 5, as the vials are dumped into the compartment, they can alight on either the sorting conveyor belt 58, or one of the two agitation conveyor belts 50, 52. Vials landing on the sorting conveyor belt 58 may align with and fall into a receptacle on the belt, in which case the vial will be transported from the sorting area. A vial landing on the sorting conveyor sideways may not fall into a receptacle, in which case it will be transported into rotatable brush 44 which will sweep the vial towards one of the sides 30, 32 of the main body, across the agitation conveyor belts 50, 52. A vial thus swept across the agitation conveyor belts, or vials that initially fall onto the agitation conveyor belts, are agitated and/or transported by the agitation belts such that they again fall onto the sorting conveyor belt into a receptacle. If the vial falls within a receptacle, it is transported out of the sorting area, if not, the vial is again swept off of the sorting conveyor belt by rotatable brush 44.

Vials transported by front agitation conveyor belt 52 are directed into diverter piece 62, which positively diverts the vial onto the sorting conveyor belt 58. Vials transported by rear agitation conveyor 50 are transported to the next compartment 36, where the rotation of the rotatable brush 44 is in the opposite direction (as described previously), and where the position of the diverter piece is against the opposite wall of main body 28. Thus, as vials are transported through the compartments 36 of the sorting area of the apparatus, they are repeatedly directed to the sorting conveyor belt 58 such that all vials eventually fall into a receptacle on the sorting conveyor belt.

The efficiency of the sorting mechanism elements within each compartment (rotatable brush, diverter piece, and agitation conveyors) is such that most vials are sorted in the initial compartments they pass through, with very few vials moving all the way to the last compartment at the far end of the sorting apparatus.

As the vials fall within the receptacles on the sorting conveyor 58, they are transported out of the sorting area into the alignment and ejection area 16. As described previously, as the vials pass under the ejection mechanism 72, the mechanism detects the metal cap at the top end of the vial, and ejects the vial from the sorting conveyor 58 into the appropriate vertical conveyor belt 64, 66. The vertically aligned sorted vials 78, with the caps positioned upwardly, are then moved onto off-take conveyor 74 where they are transported away from the apparatus for further packaging.

As can be seen, the apparatus of present invention is suitable for efficiently sorting vials for packaging. The apparatus allows for sorting either small quantities or large quantities of vials, provides a throughput of approximately one-thousand sorted vials per minute (twice that achievable by the prior art devices), does not permit vials to pend for long periods of time within the apparatus, and operates quietly.

Of course, variations on the exemplary embodiments described herein are encompassed by the present invention. For example, any type of hopper and/or loading mechanism may be used to load the vials into the apparatus. And, while the device has been described as being directed to use with sorting vials, it may be used to sort any type or size of small bottle or container with simple adaptation of the size of the associated components and receptacles in the belts. Furthermore, the number of compartments in the apparatus may be increased or decreased as necessary to support various quantities of production runs. These and other variations are within the scope of the present invention.

From the foregoing it will be seen that this invention is one well adapted to attain all ends and objectives herein above set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

The term "substantially" or "approximately" as used herein may be applied to modify any quantitative representation which could permissibly vary without resulting in a change in the basic function to which it is related. For example, while main body 28 is described as being substantially rectangular, it may vary from that shape if the variance does not materially alter the capability of the invention.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A vial sorting apparatus; comprising:
    a main body structure comprising elongated front and back side members extending substantially parallel to each other between first and second ends, and an end piece extending between and joining said side members at said first end to form a substantially rectangular sorting area therebetween having one open end;
    a plurality of dividers attached between said front and back side members to form compartments in said rectangular sorting area, said dividers comprising an upwardly extending portion having an aperture formed therein configured to receive a driveshaft therethrough;
    a driveshaft extending through at least one of said apertures in said dividers;
    a drive motor attached to an end of said driveshaft and operable to rotate said driveshaft;
    a plurality of brushes rotatably attached to said dividers such that said brushes are positioned within said compartments, said brushes coupled to said driveshaft such that rotating said driveshaft rotates said brushes within said compartments;
    at least one agitation conveyor belt extending along a bottom of said rectangular sorting area and operable to transport vials within and between said compartments; and
    a sorting conveyor belt extending along said bottom of said rectangular sorting area substantially parallel to said agitation conveyor belt, said sorting conveyor belt comprising a plurality of receptacles configured to receive a vial such that said sorting conveyor belt is operable to transport vials in said receptacles from said compartments toward said open end of said sorting area.

2. The vial sorting apparatus of claim 1, further comprising an off-take conveyor belt and further comprising at least one vertical belt positioned adjacent said open end of said sorting area, said vertical belt comprising a plurality of receptacles configured to receive a vial, said vertical sorting belt operable to receive said vial from said sorting conveyor belt and transport said vial in a vertical orientation to the off-take conveyor belt.

3. The vial sorting apparatus of claim 2, further comprising an ejection mechanism positioned adjacent said sorting conveyor belt and operable to detect a vial in said receptacle and eject said vial from said sorting conveyor belt to said vertical belt.

4. The vial sorting apparatus of claim 3, wherein said at least one vertical belt comprises first and second vertical belts positioned along opposite sides of said sorting belt, and wherein said ejection mechanism is operable to detect a top of said vial and eject said vial to one of said first and second vertical belts such that said vial is vertically oriented upright in said vertical belt.

5. The vial sorting apparatus of claim 4, wherein said ejection mechanism is operable to detect a metal cap on said vial.

6. The vial sorting apparatus of claim 2, wherein said ejection mechanism comprises a pneumatic solenoid.

7. The vial sorting apparatus of claim 6, wherein said pneumatic solenoid is operable to release pressurized air to eject said vial from said sorting belt receptacle to a vertical orientation in said vertical belt receptacle.

8. The vial sorting apparatus of claim 1, further comprising a diverter piece attached within said compartment and operable to direct a vial from said agitation conveyor.

9. The vial sorting apparatus of claim 1, wherein said brushes in adjacent compartments are configured to rotate in opposite directions.

10. A vial sorting apparatus; comprising:
    a plurality of generally rectangular compartments arranged linearly, each compartment comprising front and back sides extending substantially parallel to each other and defining a cavity therebetween;
    a plurality of dividers attached between said compartments, said dividers comprising an upwardly extending portion;
    a driveshaft extending through said upwardly extending portion of said dividers;
    a drive motor attached to an end of said driveshaft and operable to rotate said driveshaft;
    a plurality of brushes rotatably attached to said dividers and coupled to said driveshaft such that said brushes are positioned within said compartments and rotate in conjunction with said driveshaft and are operable to engage vials within said compartments;
    an agitation conveyor belt extending along a bottom of said compartments and operable to transport vials within and between said compartments; and
    a sorting conveyor belt extending along said bottom of said compartments substantially parallel to said agitation conveyor belt, said sorting conveyor belt comprising a plurality of receptacles configured to receive a vial such that said sorting conveyor belt is operable to transport vials in said receptacles from said compartments.

11. The vial sorting apparatus of claim 10, further comprising an off-take conveyor belt and further comprising at least one vertical belt positioned adjacent at least one of said compartments, said vertical belt comprising a plurality of receptacles configured to receive a vial, said vertical sorting belt operable to receive said vial from said sorting conveyor belt and transport said vial in a vertical orientation to the off-take conveyor belt.

12. The vial sorting apparatus of claim 11, further comprising an ejection mechanism positioned adjacent said sorting conveyor belt and operable to detect a vial in said receptacle and eject said vial from said sorting conveyor belt to said vertical belt.

13. The vial sorting apparatus of claim 12, wherein said at least one vertical belt comprises first and second vertical belts positioned along opposite sides of said sorting belt, and wherein said ejection mechanism is operable to detect a top of said vial and eject said vial to one of said first and second vertical belts such that said vial is vertically oriented upright in said vertical belt.

14. The vial sorting apparatus of claim 12, wherein said ejection mechanism is operable to detect a metal cap on said vial.

15. The vial sorting apparatus of claim 12, wherein said ejection mechanism comprises a pneumatic solenoid.

16. The vial sorting apparatus of claim 15, wherein said pneumatic solenoid is operable to release pressurized air to eject said vial from said sorting belt receptacle to a vertical orientation in said vertical belt receptacle.

17. The vial sorting apparatus of claim 10, further comprising a diverter piece attached within said compartment and operable to direct a vial from said agitation conveyor.

18. The vial sorting apparatus of claim 17, wherein said diverter piece comprises a curvilinear surface configured to deflect a vial away from said sides and towards said sorting conveyor.

* * * * *